United States Patent [19]

Rudkin et al.

[11] 4,237,016

[45] Dec. 2, 1980

[54] TEXTILE CONDITIONING COMPOSITIONS WITH LOW CONTENT OF CATIONIC MATERIALS

[75] Inventors: Arthur L. Rudkin, Hitchin; John H. Clint; Kenneth Young, both of Whitley Bay, all of England

[73] Assignee: The Procter & Gamble Company, Cincinnati, Ohio

[21] Appl. No.: 955,300

[22] Filed: Oct. 27, 1978

[30] Foreign Application Priority Data

Nov. 21, 1977 [GB] United Kingdom ............... 48376/77
Feb. 27, 1978 [GB] United Kingdom ................. 7687/78
Apr. 3, 1978 [GB] United Kingdom ............... 12926/78
May 30, 1978 [GB] United Kingdom ............... 48376/77

[51] Int. Cl.³ .................... D06M 13/44; D06M 15/02
[52] U.S. Cl. ....................................... 252/8.8; 8/115.6
[58] Field of Search .................. 8/115.6; 252/8.8, 547, 252/DIG. 2, 544, 8.9

[56] References Cited

U.S. PATENT DOCUMENTS

| | | | |
|---|---|---|---|
| 3,519,562 | 7/1970 | Lanner | 252/8.8 |
| 3,703,480 | 11/1972 | Grand et al. | 252/524 |
| 3,920,561 | 11/1975 | Des Marais | 252/8.8 |
| 3,974,076 | 8/1976 | Wiersema et al. | 252/8.8 |
| 3,992,304 | 11/1976 | Minegishi et al. | 252/8.8 |
| 4,031,307 | 6/1977 | DeMartino et al. | 536/114 |
| 4,035,478 | 7/1977 | Mullen | 424/70 |
| 4,045,361 | 8/1977 | Watt et al. | 252/8.8 |
| 4,061,602 | 12/1977 | Oberstav et al. | 252/547 |
| 4,126,563 | 11/1978 | Barker | 252/8.8 |
| 4,128,484 | 12/1978 | Barford et al. | 252/8.8 |

FOREIGN PATENT DOCUMENTS 2155941 5/1973 Fed. Rep. of Germany .
2724816 12/1977 Fed. Rep. of Germany .
132193 5/1977 Japan .
1195158 6/1970 United Kingdom .
1513672 6/1978 United Kingdom .

OTHER PUBLICATIONS

Jaguar C-13S Application Data Sheet and Bulletins, Celanese Co., Louisville, Ky.

*Primary Examiner*—P. E. Willis, Jr.

[57] ABSTRACT

A textile conditioning composition, especially a liquid composition, intended for use in the final rinse after a washing operation comprises a cationic surfactant, a substantially water insoluble nonionic textile softening agent and a small amount of a polymeric cationic salt, the weight ratio of cationic components to nonionic softener being less than 10:1. Preferred cationic surfactants are the substantially water-insoluble quaternary ammonium fabric softeners and preferred nonionic softening agents are the fatty acid esters of glycerol or sorbitan. Especially useful polymeric materials include the cationic galactomannan gums, especially guar gum.

7 Claims, No Drawings

TEXTILE CONDITIONING COMPOSITIONS WITH LOW CONTENT OF CATIONIC MATERIALS

BACKGROUND OF THE INVENTION

The invention relates to textile conditioning compositions comprising especially textile softening and antistatic agents characterised by an unusually low content of cationic textile conditioning agent.

Textile conditioning, especially softening compositions in the form of aqueous dispersions are well known, and are primarily intended to be added to the last rinse liquor in a conventional clothes-washing process. Most of such compositions currently on the market comprise a fairly low concentration, for instance about 3–10%, of a cationic textile softener or of a mixture of more than one, together with relatively minor amounts of emulsifiers, and with aesthetic additives such as colour and perfume. These compositions are used at quite low concentrations in the treatment bath, for instance about 0.25% by weight.

It is also known that certain nonionic, poorly water soluble or insoluble, compounds such as sorbitan and glycerol esters are effective softeners, but they are not substantive and are not effectively applied to the fabrics in a rinse or like bath. It is known yet again that combinations of these nonionic components with a cationic surfactant can cause them to be deposited upon fabrics in a rinse or like bath.

Now at present nonionic softeners are considerably cheaper than cationic and they seem likely to remain so in the foreseeable future. Therefore use of nonionic-cationic mixtures of relatively low cationic content is highly desirable since they can permit improved products to be made for the same cost. However, such mixtures, though effective in pure water, are generally not very effective in practical rinse liquors. The reason appears to be the presence in the rinse liquors of traces of anionic detergent carried through from the wash, typically 10–20 parts per million in a final rinse, and these combine with cationic conditioning agent to form complex molecules thereby reducing the performance. In wholly cationic-based softeners this loss of effective cationic active component is undesirable, but may be tolerable. In mixtures of nonionic and low levels of cationic conditioner, the loss becomes greater in proportion to the total cationic conditioner present and is serious. The use of relatively water soluble cationic surfactants has been suggested to act as scavengers for anionic detergent (see U.S. Pat. No. 3,974,076) but these need to be used at considerable levels.

It has now been found that this scavenging function can be performed by very low levels of polymeric cationic salts. This has made it possible to provide effective textile conditioning, especially textile softening and antistatic, compositions based on nonionic textile softeners with a low level of cationic surfactant to render them substantive to the fabrics. Furthermore, quite low levels of some of these polymeric cationic salts have been found unexpectedly to provide softening performance themselves in the presence of cationic surfactants thereby permitting a further reduction in the other softener components of textile softening compositions.

Textile softening and ironing assistants containing combinations of nonionic and cationic softeners containing relatively high levels of cationic dextrin are disclosed in German Offenlegungsschrift No. 2,724,816.

Furthermore, Belgian Pat. No. 844,122 describes textile conditioning compositions containing nonionic softener and low levels of cationic surfactant and suggests the use of certain oligomeric polyamine salts as cationic carrier materials for the nonionic softener.

DESCRIPTION OF THE INVENTION

The present invention then provides a textile conditioning composition comprising
(a) a cationic surfactant
(b) a substantially water insoluble nonionic textile conditioning agent, and
(c) from 0.001% to 1.4% by weight of the composition of a polymeric cationic salt, wherein the weight ratio of (a)+(c) to (b) is less than 10:1.

Preferably the compositions contain a substantial proportion of nonionic textile conditioner, for instance not more than 4 parts cationic surfactant and cationic polymer together per 1 part nonionic by weight. More preferably, the weight ratio of cationic to nonionic is in the range from 3:1 to 1:3, especially 3:1 to 1:1.

The compositions of the invention may be solids eg. granules, or gels, pastes or liquids, or they may be absorbed in or adsorbed on a water-insoluble substrate. Usually they are in the form of more or less viscous liquid dispersions and preferably the disperse phase is liquid crystalline Such liquid products usually contain from about 1% to about 30% by weight of components (a), (b) and (c) together, more usually from about 3% to 15%, especially from about 4 to 12%.

Usually the treatment bath contains from about 20 to 2,000 especially 200 parts per million by weight of said components together, and, of course, the concentration of a textile treatment composition according to the invention will depend upon the amount of the composition intended to be added to the treatment bath, such as the final rinse of a washing operation.

The carrier liquid when employed is aqueous and comprises water for the main part, optionally with some water miscible organic solvent such as, in particular, methyl, ethyl or isopropyl alcohols.

Cationic Surfactant

Any cationic surfactant may be used in the compositions of the invention. The cationic surfactants may and usually do have textile softening or antistatic properties but their main purpose in the compositions is to carry down the nonionic softeners on to the fibre surfaces. Thus those which are highly fabric substantive are preferred.

Among suitable cationic surfactants may be named the conventional substantially water-insoluble quaternary ammonium compounds, and $C_{8-25}$ alkyl imidazolinium salts.

Well-known species of substantially water-insoluble quaternary ammonium compounds have the formula:

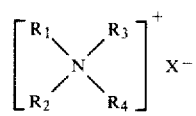

wherein $R_1$ and $R_2$ represent hydrocarbyl groups of from about 10 to about 22 carbon atoms; $R_3$ and $R_4$ represent hydrocarbyl groups containing from 1 to about 4 carbon atoms - X is any anion such as halide, a $C_2$–$C_{22}$ carboxylate, of an alkyl-or arylsulf(on)ate. Examples of preferred anions include bromide, chloride, methyl sulfate, toluene-, xylene, cumene-, and benzenesulfonate dodecylbenzenesulfonate, benzoate, parahydroxybenzoate, acetate, propionate and laurate. Representative examples of quaternary softeners include ditallow dimethyl ammonium chloride; ditallow dimethyl ammonium methyl sulfate; dihexadecyl dimethyl ammonium chloride; di(hydrogenated tallow) dimethyl ammonium chloride; dioctadecyl dimethyl ammonium chloride; dieicosyl dimethyl ammonium chloride; didocosyl ammonium chloride; di(hydrogenated tallow) dimethyl ammonium methyl sulphate; dihexadecyl diethyl ammonium chloride; di(coconutalkyl) dimethyl ammonium chloride. Ditallow dimethyl ammonium chloride, di(hydrogenated tallow-alkyl) dimethyl ammonium chloride and di-(coconutalkyl) dimethyl ammonium chloride are preferred. Also suitable are the single long chained quaternary ammonium compounds of the above formula wherein $R_1$ is $C_{10}$ to $C_{22}$ alkyl or alkenyl, preferably $C_{16}$ to $C_{20}$ alkyl, and $R_2$ $R_3$ and $R_4$ are lower alkyl groups that is $C_1$ to $C_4$ alkyl groups especially methyl, or aryl groups and X is as defined above. Optionally also two or all three of $R_2$, $R_3$ and $R_4$ may together represent a heterocyclic ring. Some representative examples of such compounds are lauryl trimethyl ammonium bromide, lauryl dimethyl benzyl ammonium chloride, myristyl dimethyl ethyl ammonium bromide, cetyl trimethyl ammonium bromide, behenyl trimethyl ammonium methosulfate oleyl methyl diethyl ammonium chloride, cetyl stearyl or oleyl pyridinium chloride, behenyl pyridinium bromide, stearyl methyl morpholinium chloride, stearyl or oleyl ethyl or propyl morpholinium chloride.

Yet other quaternary ammonium cationic surfactants which may be mentioned have the formula:

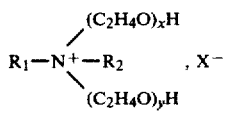

wherein $R_1$ and $R_2$ are as defined above or $R_2$ may be hydrogen and x and y are at least 1 and (x+y) is from 2 to 25. Examples are:

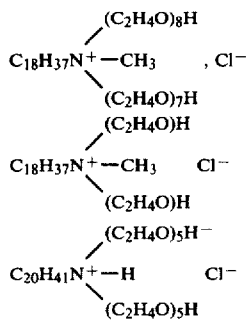

Substances of this sort are sold commercially, for instance under the Trade Name "Ethoquads".

Another class of suitable cationic surfactants can be represented by $C_{8-25}$ alkylimidazolinium salts. Preferred salts are those conforming to the formula:

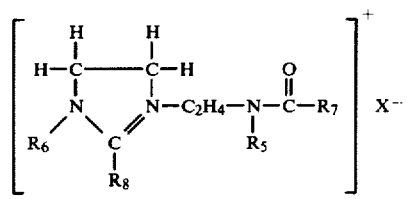

wherein $R_6$ is a $C_1$–$C_4$ alkyl radical, $R_5$ is hydrogen or a $C_1$–$C_4$ alkyl radical, $R_8$ is a $C_8$–$C_{25}$ alkyl radical and $R_7$ is hydrogen or a $C_8$–$C_{25}$ alkyl radical. X is a charge balancing ion which has the same meaning as X defined in the quaternary ammonium surfactant above.

A preferred member of this class, believed to have $R_6$ methyl, $R_7$ and $R_8$ tallow alkyl, $R_5$ hydrogen, is sold under the Trade Name Varisoft 455 (Ashland Chemical Company).

Among other suitable cationic surfactants may be mentioned the substituted polyamine salts of general formula

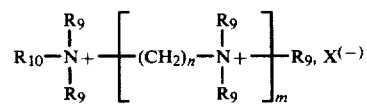

wherein $R_{10}$ is an alkyl or alkenyl group having from about 10 to 24, preferably 12 to 20, especially from 16 to 18 carbon atoms, the groups $R_9$ which may be the same or different, each represent hydrogen, a $(C_2H_4O)_pH$, or a $(C_3H_6O)_gH$, or a $C_{1-3}$ alkyl group where p and g may each be 0 or a number such that (p+g) does not exceed 25, n is an integer from 2 to 6, preferably 3, m is from about 1 to 9, preferably from 1 to 4, most preferably 1 or 2, and $X^{(-)}$ represents one or more anions having total charge balancing that of the nitrogen atoms.

Preferred compounds of this class are, more preferred, N-tallow-N,N$^1$,N$^1$-trimethyl-1,3-propylene diamine dichloride or di-methosulphate, commercially available under the Trade Names Lilamin 540 EO-3 (Lilachem), Dinoramax SH3, Inopol ODX3 (Pierrefitte-Auby), and N-tallow-N,N,N$^1$,N$^1$,N$^1$-pentamethyl-1,3-propylene diamine chloride, commercially available under the Trade Names Stabiran MS-3 (Pierrefitte-Auby); Duoquad (Armour Hess); Adogen 477 (Ashland Company). Also suitable is the substance sold as Dinormac (Pierrefitte-Auby) or Duomac (Armour Hess) believed to have the formula:

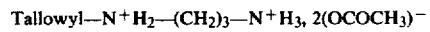

or the corresponding chloride. Herein Tallowyl represents predominantly $C_{16}$ and $C_{18}$ alkyl groups derived from tallow fatty acids.

Other suitable cationic surfactants are described in our co-pending patent applications 22739/77 and USSN 770,487. Some suitable commercially available substances are marketed under the following Trade Names:
Sopa (Pierrefitte-Auby)
Sopapa (Pierrefitte-Auby)
Lilamin LS33 (Lilachim)
Polyram L 200 (Pierrefitte-Auby)
Taflon - 320A (Diichi Kogyo Seiyaku Co.).
Mixtures of two or more of these cationic surfactants may be employed.

When the compositions of the invention are in the conventional form of dispersion of active components in an aqueous carrier medium, they usually contain from about 0.1 to 14% cationic surfactant, preferably from about 0.3 to 4%.

Nonionic Fabric Conditioning Agents

The nonionic fabric conditioning, especially softening agents are substantially water-insoluble and usually have at least one $C_{12-24}$ alkyl or alkenyl chain in their molecular structure.

A preferred group of nonionic softeners consists of the fatty acid esters of a mono- or poly-hydric alcohol or anhydride thereof, said alcohol or anhydride having from 1 to 12 carbon atoms, preferably 1 to 18 carbon atoms. It is preferred that the fatty acid ester has at least 1, more preferably at least 2, free (i.e. unesterified) hydroxyl groups.

The mono- or poly-hydric alcohol portion of the ester can be represented by methanol, isobutanol, 2-ethylhexanol, isopropanol, ethylene glycol and polyethylene glycol with a maximum of 5 ethylene glycol units, glycerol, diglycerol, polyglycerol, xylitol, erithritol, pentaerythritol, sorbitol or sorbitan, sugars such as glucose, fructose, galactose, mannose, xylose, arabinose, ribose, 2-deoxy ribose, sedoheptulose and sucrose. Ethylene glycol, glycerol and sorbitan esters are particularly preferred, especially the monoesters of glycerol.

The fatty acid portion of the ester normally comprises a fatty acid having from 12 to 22 carbon atoms, typical examples being lauric acid, myristic acid, palmitic acid, stearic acid, arachidic acid and behenic acid, oleic and linoleic acid and some unsaturated higher fatty acids.

The glycerol esters are very highly preferred. These are the mono-, di- or tri-esters of glycerol and fatty acids of the class described above. Commercial glycerol monostearate, which may contain a proportion of di- and tristearate, is suitable. Also useful are mixtures of saturated and unsaturated esters of glycerol derived from mixed saturated and unsaturated fatty acids.

Another very suitable group of nonionic softening agents is the sorbitan esters, and they are described in German Offenlegungsschrift No. 2,516,104. Sorbitan mono- and di-esters of lauric, myristic, palmitic, stearic, arachidic or behenic, oleic or linoleic acids and unsaturated higher fatty acids are particularly useful as softening agents and can also provide antistatic benefits. Sorbitan esters are commercially available for instance under the Trade Name Span. For the purpose of the present invention, it is preferred that a significant amount of di- and trisorbitan esters are present in the ester mixture. Ester mixtures having from 20%–50% mono-ester, 25%–50% di-ester and 10%–35% of tri- and tetra-esters are preferred.

Another group of suitable esters is constituted by esters of fatty alcohols having from 12 to 24 carbon atoms in the alkyl chain, and mono- or poly-carboxylic acids having from 1 to 8 carbon atoms in the alkyl chain, the total number of carbon atoms in the ester being at least 16.

Yet other suitable esters are described in the Certificate of Addition No. 78 15970 to French Patent Application No. 76 21,450.

Yet another class of water insoluble nonionic compounds which can form part or all of the textile conditioner component (b) of the composition of the invention consists of the hydrocarbon waxes, such as paraffin waxes, microcrystalline petroleum waxes, and synthetic hydrocarbon waxes. Waxes of these types are described in the book "Chemistry and Technology of Waxes", A. H. Warth, Second Edition, published 1960.

Preferred hydrocarbon material has from 12 to 24 carbon atoms, and especially preferred are liquid mixtures of $C_{14}$–$C_{18}$ paraffins. Especially in combination with imidazolinium softeners, these materials can be utilised in the preparation of unusually concentrated softening compositions of the present invention. For example, compositions having from 15% to 40% active ingredients can be prepared.

In the case where solid, higher melting point waxes are used, the composition should have a relatively high ratio of cationic compounds (a) and (c) to nonionic softener component (b); for instance greater than about 1:1 by weight, and all or nearly all of the nonionic softener may consist of hydrocarbon waxes. In compositions where this ratio is relatively low, desirably only part of the nonionic softener component is hydrocarbon wax, for instance up to 20% by weight. If too much wax is employed in the nonionic softener, it is found that the disperse phase flocculates either in the composition itself or in treatment baths containing the composition at customary usage levels, and softening performance is reduced.

Some very effective microcrystalline hydrocarbon waxes are:

Microcrystalline wax 160/165 sold by Shell Chemicals
Microcrystalline wax 185/190 sold by Shell Chemicals
 (the numerical ranges are believed to represent the melting point ranges — °F.).
Microcrystalline wax 160/25Y sold by BP Chemicals.
Microcrystalline wax OK239 sold by Astor Chemical Ltd.
Mobilwax 2305 sold by Mobil Oil Company Limited, and
Mobil wax 2360 sold by Mobil Oil Company Limited.
Witcodur 263 Mpt. 83°–89° C. sold by Witco Chemicals (Holland)
Witcodur 272 sold by Witco Chemicals (Holland)
Witcotack 143 Mpt 79°–84° C. sold by Witco Chemicals (Holland)
Witcotack 145 Mpt 78°–83° C. sold by Witco Chemicals (Holland)
Witcovar 146 Mpt 70°–75° C. sold by Witco Chemicals (Holland)

Fischer-Tropsch waxes, such as those sold by Veba Chemic AG are also suitable, such as Veba Wax SP 1044 (melting point about 106° to 111° C.).

Waxes of these sorts are described in German Offenlegungsschrift No. 2,500,411. Ester waxes are disclosed in said application such as carnauba or beeswax may be employed.

Generally it is preferred that waxes, if present, do not constitute more than about 20%, preferably 10% by weight of the nonionic conditioner component (b).

Especially preferred nonionic softeners and mixtures thereof are:

(i) Glycerol monostearate, especially when relatively high ratios of cationic components (a) and (c) to nonionic softener component for instance at least 2:3 are employed.

(ii) A mixture of 75% by weight of glycerol monostearate and 25% Dimodan LS (Trade Name, a monoglyceride believed to be derived from Sun Flower Oil - 20% oleyl, 70% linoleyl, 10% stearyl).

(iii) A mixture of 75% by weight glycerol monostearate and 25% by weight MONOESTER (Trade Name, believed to be a mixture of mono-, di- and tri-glycerides, of $C_{16}$, $C_{18}$, $C_{20}$, $C_{22}$ fatty acids, 66% of which are unsaturated acids).

(iv) Sorbitan monostearate, so-called, containing 5%, by weight of the acids components, of unsaturated acids.

(v) Hardened rapeseed monoglyceride (high erucic). This is believed to comprise 36% monoglycerides, 64% di- and tri-glycerides. The fatty acid chain lengths are 40% $C_{16}/C_{18}$, 7% $C_{20}$, 53% $C_{22}$. Two varieties are suitable, viz with about 10% and with about 36% unsaturated acids (by weight of the total acids).

(vi) "Fish Oil" monoglyceride. This is believed to comprise 40% mono, 60% di-, and tri-glycerides. The fatty acid chain lengths are 6% $C_{14}$, 24% $C_{16}$, 25% $C_{18}$, 25% $C_{20}$, 20% $C_{22}$, and it has about 25% unsaturated acids.

(vii) A mixture of 75% sorbitan mono stearate (as in paragraph (iv) above) and 25% sorbitan monooleate.

In compositions in the form of aqueous dispersions, the content of nonionic softener is usually in the range from about 0.5 to 24%, preferably from about 2 to 10%, especially from about 4 to 8%.

The ratio of cationic components to nonionic softener is preferably not greater than 4:1 by weight, and is more preferably not greater than 3:1, most preferably in the range from about 3:1 to 1:1.

Polymeric Cationic Salts

A great many types of polymeric cationic compounds are suitable for the present invention. These can be polyamine derivatives, in the form of their salts or may be polymeric ammonium or phosphonium or sulphonium salts. They include derivatives of what may be called the natural polymers eg. starch, cellulose, gums and proteins, or of what may be called synthetic polymers such as those based upon polyvinyl, polyethylenimine or polyalkoxy backbones. Preferably the polymeric cationic salts are water soluble, for instance to the extent of at least 0.5% by weight at 20° C. Generally it is preferred that the cationic polymers have more than 10 monomer units in their molecules. Preferably they have molecular weight from about 1,000 to 1,000,000, especially from about 2,000 to 500,000. As a general rule, the lower the molecular weight the higher the degree of substitution (D.S.) by cationic, usually quaternary, group which is desirable, but no precise relationship appears to exist.

Suitable "natural" polymers which may be converted into cationic polymers include many polysaccharides and derivatives thereof, such as (a) hydroxyalkyl celluloses, eg.. having formula
(i) cell—O(CH$_2$)$_n$OH ie. linear where n is from 1–4.
(ii)

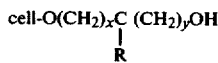

ie. branched, wherein x is from 1 to 3, y is from 1 to 3, x+y is from 2 to 4, R is $C_{1-3}$ alkyl.

Substances of these classes, for instance hydroxymethylhydroxyethyl and hydroxypropyl celluloses are available commercially.

(b) alkyl hydroxyalkyl cellulose eg. having formula as (a) but with additionally alkyl substituents at other hydroxyl sites on the anhydroglucose unit. Ethyl hydroxyethyl celluloses have been marketed under the Trade Name "Modocoll" by Messrs. Berol-Kemi, and are believed now to be renamed "Bermocoll". Typical grades are E 600 believed to have molecular weight about 500,000 and E 10 believed to have molecular weight about 70,000 bases on viscosity data.

(c) Alkyl celluloses, preferably of low degree of substitution (alkyl) ie. containing at least 1.5 free hydroxyl sites per anhydroglucose unit. These substances are commercially available eg. the "Methocels" (Trade Name) of Dow Chemicals.

(d) Starch and dextrins. These include starches derived from maize, wheat, barley etc. and from roots such as potatoes, tapioca, etc., and dextrins such as, in particular, pyrodextrins such as British Gum and White Dextrin.

(e) Various gums such as:
  (i) galactomannan gums and derivatives thereof eg. guar gum, locust bean gum. Guar gums are marketed under the Trade Names CSAA M/200, CSA 200/50 by Messrs. Meyhall and by Messrs. Stein Hall, and hydroxyalkylated guar gums are available from the same suppliers.
  (ii) Xanthan gum
  (iii) Ghatti gum
  (iv) Tamarind gum
  (v) Gum Arabic
  (vi) Agar
all of which are commercially available.

(f) Proteins and derivatives thereof, such as Toprina (Trade Name BP Chemicals) believed to be a single cell protein. Vizate 243 (Trade Name Stanley) Corn based proteins D-100 (Gunther-Stanley) Soy based protein Polypeptide eg. X1,000 (Trade Name Wilson) Collagen derived protein eg. gelatin, oxybutylated gelatin.

These substances can be rendered cationic by attaching a cationic group at the reactive hydroxyl or carboxyl sites. Any cationic groups may be attached, such as quaternary ammonium, phosphonium or sulphonium groups, or amino-groups, generally as their salts. The most usual are quaternary ammonium groups, and especially groups such as:

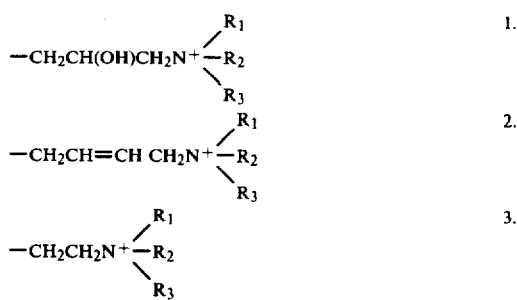

wherein $R_1$, $R_2$ and $R_3$ are lower alkyl groups, or aryl groups or up to 2 of them may be $C_{1-22}$ alkyl groups, or two or all may together constitute a heterocyclic ring which may be saturated or unsaturated eg. aromatic. The use of radical 2 is described in U.S. Pat. No. 4,031,307 assigned to Celanese Corp.

The degree of substitution by the cationic substituent, that is the average number of substituted groups attached per anhydro sugar unit can vary widely but it is usually at least 0.1. The practical optimum may be different with different polymeric starting materials.

Some valuable cationic derivatives of the various polysaccharides described above are the following:

Cationic hydroxyalkyl celluloses and their preparation are described in BP No. 1166062, assigned to the Union Carbide Corp. Some suitable cationic hydroxyethyl celluloses are marketed under trade designations JR 125, JR 400 (Union Carbide Corporation), believed to have molecular weights of the order of 250,000 and 400,000 respectively, and a degree of substitution (quaternary group) of the order of 0.3, and they are usually employed at low levels of from about 0.05% to about 0.5%, preferably from about 0.05 to about 0.3% by weight in the compositions of the invention.

Cationic ethyl hydroxyethyl celluloses are prepared as indicated below starting for instance with "Modocoll" (Trade Name). These substances are believed to have a D.S. of about 0.1 to 0.8. especially about 0.5. When compositions according to the invention contain these polymers, they preferably constitute from about 0.05 to 0.5% by weight of the composition, especially from about 0.1 to 0.3%.

These substances act both as scavengers for residual anionic surfactant in the treatment bath and as softening enhancers, when combined with components, (a) and (b), even in baths containing no residual anionic surfactant.

The starches and dextrins may be rendered cationic as indicated below. In particular, cationic dextrins, such as white dextrin, or British Gum, which dextrins have molecular weight from about 2,000 to 10,000 usually 3,000 are effective scavengers for anionic surfactants. Preferably the D.S. is in the range from 0.1 to 1.0 especially about 0.2 to 0.8. Also suitable are starches, especially the linear fraction thereof (amylose) rendered cationic in the normal manner. DS is usually 0.01 to 0.9, preferably rather higher than in conventional cationic starches, ie. typically from about 0.2 to 0.7. Normally the cationic dextrins comprise from about 0.05 to 1.0% by weight of the compositions of the invention, preferably about 0.2% to 0.5%.

Of the gums, cationic guar gum and locust bean gum are preferred. They may be prepared by the general methods described below, and preferably have D.S. from about 0.05 to 1.0 especially 0.1 to 0.5. The molecular weight of guar gum is believed to be from 100,000 to 1,000,000 usually about 220,000. A suitable cationic guar gum, D.S. about 0.13 is marketed under the name Jaguar C-13 S by Messrs. Meyhall and is believed to have as cationic moiety the group

—CH$_2$CH(OH)CH$_2$N$^+$Me$_3$, Cl$^-$

Also very suitable is cationic guar gum carrying the group
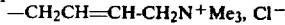
—CH$_2$CH=CH-CH$_2$N$^+$Me$_3$, Cl$^-$ with a degree of substitution of about 0.2 to 0.5.

Cationic guar gums are a highly preferred group of cationic polymers in compositions according to the invention, and both act as scavengers for residual anionic surfactants and add to the softening activity of cationic softeners even when used in baths containing little or no residual anionic surfactant. Cationic guar gums are effective at levels from about 0.05% or even lower to 0.7% of the composition by weight, especially up to about 0.5%.

Other polysaccharide-based gums may be rendered cationic similarly and act substantially in the same way.

Many classes of what may be called "synthetic" polymers may also be employed, and these may be homopolymers or co-polymers.

Some examples of homopolymers include the following viz homopolymers of:

(a) polyvinyl benzyl ammonium eg. polyvinyl benzyl trimethyl ammonium chloride.

(b) poly N-vinyl pyridinium, poly N- vinylalkyl pyridinium, eg. N-vinyl methyl-, ethyl-, propyl-pyridinium, poly N-vinyl dialkyl pyridinium eg. N-vinyl ethyl methyl-pyridinium.

(c) polyvinyl pyridinium eg. poly 2-vinyl pyridinium eg. poly 2-methyl-5-vinyl pyridinium.

(d) poly N-vinyl imidazolinium, poly N-vinyl alkyl imidazolinium eg. poly 2-methyl-1-vinylimidazolinium.

(e) poly 2-vinylimidazolinium.

(f) polydiallyl ammonium poly dialkyl diallyl ammonium eg. poly (N,N-dimethyl-3,5-methylene piperidinium).

(g) polyvinyl alkyl ammonium eg.

where R$_1$, R$_2$, R$_3$ are selected from CH$_3$, C$_2$H$_5$, C$_3$H$_7$, C$_7$H$_{15}$,

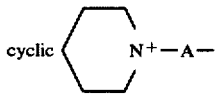

and A is +CH$_2$+$_n$ where n is, 1-3 or $$-CH_2CHOHCH_2-\overset{O}{\overset{\|}{C}}-CH_2-$$

(h) poly 2-alkacryloxyalkyl trialkylammonium eg. (poly 2-methacryl-oxyethyl trimethylammonium), viz

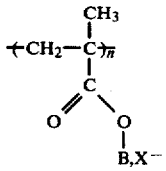

wherein B is —(CH$_2$)$_2$—N$^{+Me}$$_3$ or —CH$_2$CH(OH)CH$_2$N$^+$Me$_3$ (i) poly N-vinyl carbazole.

(j) polyvinyl alcohol. These polymers are available under the Trade Name "Elvanols" from Messrs. Dupont deNemours Co., and also from Messrs Allied Colloids and Monsanto.

Some examples of co-polymers are those having as repeating units any of the monomers a-j above and monomers selected from k and l below.

(k) vinyl aromatic compounds eg. styrene, isopropenyl toluene (l) vinyl aliphatic compounds (i) acrylonitriles eg. acrylonitrile, methacrylonitrile, ethacrylonitrile, phenacrylonitrile (ii) acrylamides, eg. acrylamide, methacrylamide, ethacrylamide; N-substituted acrylamides and N-substituted alkacrylamides, eg. N-methylol acrylamide; N-monoalkyl-N,N-dialkyl acrylamides and methacrylamides, eg. monoethyl, -ethyl, -propyl, -butyl, and N,N-dimethyl-, N,N-diethyl-, N,N-dipropyl-, N,N-dibutyl acrylamides and methacrylamides; N-monoaryl and N,N-diaryl acrylamides and alkacrylamides eg. N-monophenyl-, N,N-diphenyl- acrylamides and methacrylamides.

(iii) vinyl esters
  (a) eg. vinyl acetate, propionate, butyrate, isobutyrate, valerate,
  (b) esters of acrylic acid (+ the acid itself and the α-substituted acids);
  eg. methacrylic acid, ethacrylic acid, phenylacrylic acid; alkyl esters of an acrylic acid eg. methyl ethyl, propyl, isopropyl, n-butyl, isobutyl, tert-butyl esters of acrylic, methacrylic, ethacrylic, phenacrylic acids; N,N-dialkyl amino alkyl esters of an acrylic acid eg. N,N-dimethyl, N,N-diethyl, N,N-dipropyl, N,N-dibutyl amino methyl, N,N-diethyl amino propyl esters of acrylic, methacrylic, ethacrylic and phenylacrylic acids.

(iv) vinyl ethers eg. methyl vinyl ether, aminoethyl vinyl ether.

(v) N-vinyl compounds eg. N-vinyl pyrrolidone, N-vinyl carbazole.

The monomers may be distributed in any order or arrangement within the polymer molecule, but it is preferred that the cationic nitrogens be fairly evenly distributed within the polymer molecule. Some very effective synthetic polymeric cationic salts are the following:

(a) Polyvinyl pyridine, molecular weight about 40,000, with about 60% of the available pyridine nitrogens quaternised, (b) Copolymer of 70/30 molar proportions of vinyl pyridine/styrene, molecular weight about 43,000, with about 45% of the available pyridine nitrogens quaternised as above.

(c) Copolymer of 60/40 molar proportions of vinyl pyridine/acylamide, with about 35% of the available pyridine nitrogens quaternised as above.

(d) Copolymers of 77/23 and 57/43 molar proportions of vinyl pyridine/methyl methacrylate, molecular weight about 43,000, with about 97% of the available pyridine nitrogens quaternised as above.

These polymeric cationic salts are effective in the composition at very low concentrations for instance from 0.01% by weight to 0.2% especially from about 0.02% to 0.1%. In some instances the effectiveness seems to fall off when the content exceeds some optimum level, such as for polyvinyl pyridine and its styrene copolymer about 0.05%.

Other effective synthetic polymeric cationic salts are: copolymer of vinyl pyridine and N-vinyl pyrrolidone (63/37) with about 40% of the available pyridine nitrogens quaternised, copolymer of vinyl pyridine and acrylonitrile (60/40) quaternised as above, copolymer of N,N-dimethylaminoethyl methacrylate and styrene (55/45) quaternised as above at about 75% of the available amino nitrogens.

Eudragit E (Trade Name of Rohm GmbH) quaternised as above at about 75% of the available amino nitrogens. Eudragit E is believed to be copolymer of N,N-dialkyl amino alkyl methacrylate and a neutral acrylic ester, and to have molecular weight about 10,000 to 1,000,000. Co-polymer of N-vinyl pyrrolidone and N,N-dimethyl amino methyl methacrylate (40/60), quaternised to about 50% of the available amino nitrogens. In practice, it is usually desirable though not essential to polymerize the unquaternised forms of the monomers and to react the polymer so formed with a quaternising agent in a suitable solvent to prepare quaternary polymers.

Yet other co-polymers are condensation polymers, formed by the condensation of two or more reactive monomers both of which are bifunctional. Two broad classes of these polymers may be formed which are then made cationic, viz (a) those having a nitrogen atom which may be cationic in the back bone, and (b) those not containing a nitrogen which may be made cationic in the back bone but containing a reactive site which will facilitate introduction of a cationic group.

Compounds of class (a) may be prepared by condensing a tertiary or secondary amine of formula:

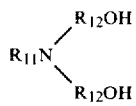

wherein $R_{11}$ is H or a $C_{1-6}$ alkyl group, preferably methyl, or $R_{12}OH$ and each $R_{12}$ independently is a $C_{1-6}$ alkylene group, preferably ethylene, with a dibasic acid, the corresponding acyl halide or anhydride having formula

or

wherein $R_{13}$ is a $C_{1-6}$ alkylene, hydroxy alkylene or alkenyl group or an aryl group, and X is H, or a halide preferably chloride. Some suitable acids are succinic, malic, glutaric, adipic, pimelic, suberic, maleic, ortho-, meta- and tere-phthalic, and their mono and di-chlorides. Very suitable anhydrides include maleic and phthalic anhydrides. The condensation leads to polymers having repeating units of structure

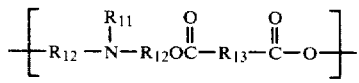

Reactions of this sort are described in British Patent Specification No. 602,048.

These can be rendered cationic for instance for addition of an alkyl or alkoyl halide or a di-alkyl sulphate at the back bone nitrogen atoms or at some of them. When $R_{11}$ is ($R_{12}OH$) this group can be esterified by reaction with a carboxylic acid, e.g. a $C_{1-20}$ saturated or unsaturated fatty acid or its chloride or anhydride. When long chain, about $C_{10}$ and higher, fatty acids are employed these polymers may be described as "comb" polymers.

Alternatively when $R_{11}$ is $(R_{12}OH)$ the $R_{11}$ groups may be reacted with a cationic e.g. a quaternary ammonium group such as glycidyl trimethyl ammonium chloride or 1-chloro-but-2-ene trimethyl ammonium chloride, and like agents mentioned hereinafter.

Some cationic polymers of this class can also be made by direct condensation of a dicarboxylic acid etc. with a difunctional quaternary ammonium compound having for instance the formula

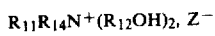

where $R_{14}$ is an H or $C_{1-6}$ alkyl group, and $R_{11}$ and $R_{12}$ are as defined above, and $Z^-$ is an anion.

Some non limiting typical examples of polymers of this class have repeating units as follows:

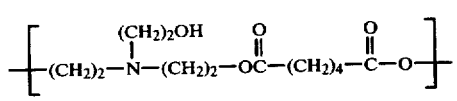
(a)

from triethanolamine and adipic acid or its acid di-chloride.

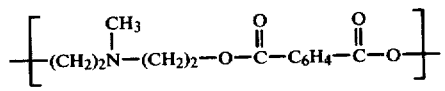
(b)

from methyl diethanolamine and ortho or tere phthalic acid or phthalic anhydride

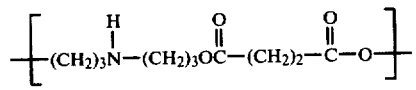
(c)

from dipropanolamine and succinic acid or anhydride

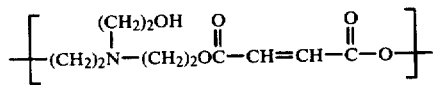
(d)

from triethanolamine and maleic anhydride.

Cationic derivatives of these polymers may be illustrated by the following, based on polymers of class (a).

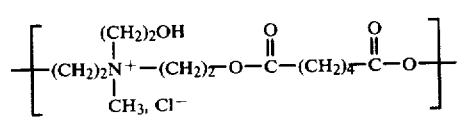
(e)

by quaternisation of the back bone nitrogen by methyl chloride.

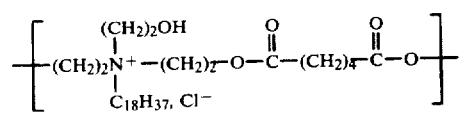
(f)

by quaternisation of the back bone nitrogen by octadecyl chloride.

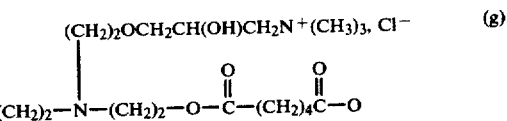
(g)

by reaction of the ethanol branches with glycidyl trimethyl ammonium chloride.

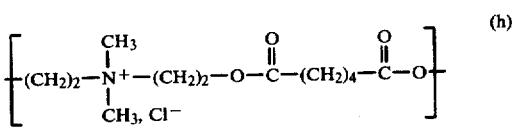
(h)

by direct condensation polymerisation of dimethyl diethanol ammonium chloride with adipic acid.

Another class of copolymer with nitrogens which can be made cationic in the back bone can be prepared by reaction of a dicarboxylic acid, etc. as defined above with a dialkylene triamine, having structure

where $R_{15}$ and $R_{16}$ independently each represent a $C_{2-6}$ alkylene group, and $R_{17}$ is hydrogen or a $C_{1-6}$ alkyl group. This leads to polymers having the repeating unit

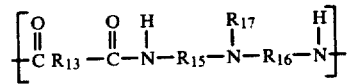

wherein the nitrogen not directly linked to a CO group i.e. not an amide nitrogen, may be rendered cationic, as by reaction with an alkyl halide or dialkyl sulphate.

Some non limiting typical examples of polymers of this class are as follows:

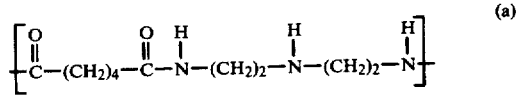
(a)

from diethylene triamine and adipic acid, leading by reaction with e.g. excess $(CH_3)_2 SO_4$ to

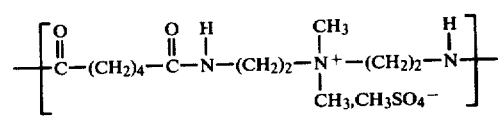

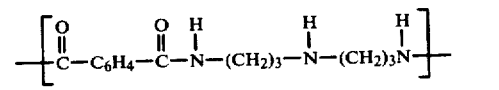
(b)

from diproplyene triamine and phthalic acid or anhydride, leading by reaction with e.g. excess $C_{12}H_{25}I$ to

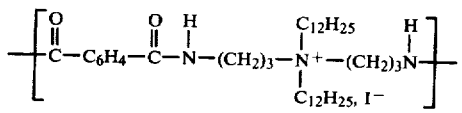

Commercial examples of a condensation polymers believed to be of this class are sold under the generic Trade Name Alcostat by Messrs. Allied Colloids.

Yet other cationic polymeric salts are quaternized polyethyleneimines. These have at least 10 repeating units, some or all being quaternised, that is having the formula:

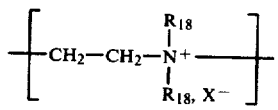

where $R_{18}$ is $C_{1-20}$ alkyl, or benzyl, and X is an anion.

Commercial examples of polymers of this class are also sold under the generic Trade Name Alcostat by Messrs. Allied Colloids.

It will be appreciated by those skilled in the art that these quaternisation and esterification reactions do not easily go to completion, and usually a degree of substitution up to about 60% of the available nitrogen is achieved and is quite effective. Thus it should be understood that usually only some of the units constructing the cationic polymers have the indicated structures.

Polymers of class (b), with no nitrogen in the back bone can be made by reacting a triol or higher polyhydric alcohol with a dicarboxylic acid etc. as described above. Employing glycerol, for example, thus leads to polymers having the repeating unit

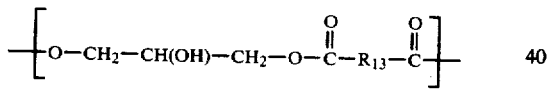

wherein $R_{13}$ is as defined above. These polymers can be reacted with cationic groups at the hydroxyls, or at some of them.

Of course, mixtures of any of the above described polymeric cationic salts may be employed, and the selection of individual polymers or of particular mixtures can be used to control the physical properties of the compositions such as their viscosity and the stability of the aqueous dispersions.

These cationic salts of condensation polymers are usually effective at levels of from about 0.05% or even lower to about 0.7% by weight of the compositions of the invention, especially up to about 0.5%.

The "synthetic" polymers may be prepared from the monomers by the methods known in the art, such as by free radical, graft, condensation or ionic polymerisation. Detailed descriptions of these methods can be found in general text books on polymers such as "Polymer Chemistry" by B. Vollmert, and "Polymer Handbook" (Edited by J. Brandrup, and E. H. Immergut).

In general, the free radical method comprises adding a trace of radical initiator, such as benzoylperoxide, or azobisisobutyro-nitrile, to the monomer, or in the case where co-polymers are being made, to the mixture of monomers. The monomer(a) may be reacted neat or a non-participating solvent may be present such as, when appropriate, and commonly, benzene. The reaction is normally carried out in the absence of oxygen by holding the reaction mixture, usually with agitation, for from 2 to 48 hours at from 40° to 100° C., generally for about 4 to 24 hours at 60°–70° C. After polymerisation the product may be recovered, for instance, by precipitation from a non-solvent, filtration and drying.

Condensation polymers may generally be prepared by reacting two (or more) monomers at high temperature (above 100° C.) for several hours (5–40 hours) in an inert atmosphere (nitrogen or carbon dioxide) and often under pressure. Formation of polymer results in a build up of small molecules which must be removed to further the polymerisation. In the case where water is to be eliminated this is conveniently carried out in the presence of an azeotrope-forming solvent e.g. xylene and the water is distilled from the mixture as the reaction proceeds. The polymer is recovered at the end of the reaction thoroughly dried, and rendered cationic as described hereinafter. The MW is most usually in the range $1-80 \times 10^3$ since total elimination of, for example, water is very difficult technically, normally levels of conversion being about 98.0% or slightly above.

In preparing cationic derivatives of polymeric substances which do not already contain a quaternisable nitrogen atom in their structure (they may contain non-quaternisable nitrogen atoms such as amido groups), but contain reactive hydroxyl or carboxyl groups, various agents known in the art may be employed. Some very suitable agents are:

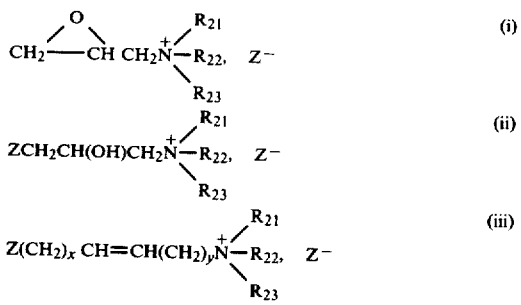

wherein $R_{21}$, $P_{22}$ and $P_{23}$ are described above and Z is halogen or other anion, x and y are each from 1 to 3 and $x+y$ is from 2 to 4.

Typical end groups are:

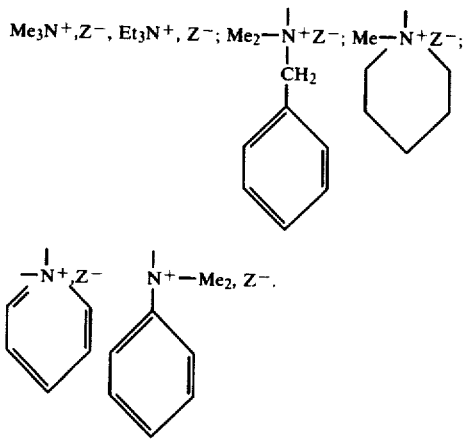

Alternatively the hydroxyl or carboxyl groups may be reacted with a dialkyl amino alkyl halide, and the tertiary amine may be quaternised to the salt form by reaction with a quaternising agent such as alkyl halide, dialkyl sulphate, alkaryl halide, such as benzyl chloride or propylbenzyl chloride, or an epihalohydrin.

The polymeric compound as made or as obtained may already contain nitrogen atoms (or phosphorus atoms or sulphoxide groups) which can provide cationic salts. Often these nitrogens etc. can also be quaternised. A wide variety of quaternising agents known in the art may be employed. Some examples are dimethyl sulphate, $C_{1-22}$ alkyl halides such as methyl chloride, dodecyl chloride, octadecyl chloride, and the corresponding bromides or iodides, alkaryl halides such as benzyl chloride, substituted alkaryl halides such as propylbenzyl chloride, epihalohydrin such as epichlorohydrin.

In quaternising polymers already containing a quaternisable nitrogen, the polymer may be dissolved in a suitable solvent and the quaternising agent added. Reaction may be allowed to proceed at temperatures usually in the range 20° to 90° C., especially 30° to 70° C. Reaction times vary according to the nature of the reactants from a few minutes to as much as some 96 hours, but are more usually about 15 minutes to 48 hours. Ordinarily the polymeric salt as formed is precipitated from the reaction mix, and it may be recovered for instance by filtration, washing and drying.

In quaternising polymers not containing quaternisable nitrogen, the polymers and, for instance, epoxypropyl trialkyl ammonium halide are mixed, this time in an alkaline aqueous medium, in similar conditions to those described above. At the end of the reaction period the mixture is neutralised and the cationic salt may be recovered by addition of a water-insoluble non-solvent to precipitate it, followed by isolation in the ordinary way.

The compositions may contain other compatible components such as bactericides and fungicides, whether to protect the product or fabrics treated therewith from attack, tarnish inhibitors, viscosity modifiers, emulsifying agents, other textile conditioning agents and components having aesthetic properties, such as perfumes and colours. Also, silicones may be included, such as those described in German Offenlegungsschrift No. 2,631,419.

In preparing the liquid products according to the invention any effective method of mixing the components may be used. In general it is usually desirable to make a premix by melting together the softener components (a), (b) and (c), often at a temperature of about 65° C. Especially in cases where these components include appreciable amounts of free amines, an acid or acid anhydride is added is small amounts to protonate or acetylate said amines. This premix is added with appropriate mixing, sometimes high shear mixing being necessary, to a watery mixture at a temperature above the melting point of the premix containing the water for the composition together with mostly the water soluble components such as colour, bactericide and sometimes a small amount of an electrolyte such as calcium chloride. The mixture is allowed to cool usually with continued stirring. The products are usually weakly acidic, partly to ensure that at least a substantial proportion of any amines present is protonated. The preferred pH of the products is from about 3 to 7, especially from about 4.5 to 5.5.

It is advisable that liquid products according to the invention should be fairly viscous, for instance so that they do not appear "watery" to the user, and because it is easier to avoid phase separation in viscous dispersions or emulsions. On the other hand, too high viscosity leads to difficulty in dispensing the product from its container and may lead to poor dispersion of the product in the usage bath, as in a washing machine rinse liquor. A preferred viscosity range is from about 20 to about 300 cp. These values represent the viscosity measured at 21° C. by a Brookfield Synchroelectric Viscometer Model LVF, using Spindle No. 2, at 60 RPM.

Some of the cationic polymers especially those containing a significant proportion of hydroxyl groups in the repeat units, and cationic guar gums is one of these, tend to give products which have undesirably high viscosity either when freshly made or sometimes, more especially, after some days or weeks of storage. It has been found possible to control (usually to reduce) the viscosity of such compositions by including an emulsifying agent and/or an electrolytic salt in the composition. Use of emulsifier alone may not always reduce the viscosity enough. Use of electrolytic salt alone may only reduce the viscosity enough at the expense of loss of phase stability of the dispersion or emulsion. Accordingly it is preferred to use both additives together, to achieve adequately reduced and constant viscosity, without problems of phase separation. Any effective emulsifying agent or mixture thereof may be employed, usually in amounts from about 0.1 to 1.0% by weight of the compositions, preferably from about 0.3 to 0.7%. Some suitable agents are as follows:

Fatty acyl ($C_{12}$–$C_{20}$) ethoxylated sorbitan esters e.g. "Tweens", and especially Tween 60. "Tween" is a registered Trade Mark. (ICI America Inc). Ethoxylated primary and secondary branched and unbranched fatty alcohols having 8–20, preferably 12–18 carbon atoms in the molecule and about 3 to 30 ethoxy groups. These substances are widely available commercially under Trade Names such as Dobanol, Lial, Alfol, Tergitols. Among preferred members of this class are tallow alcohols condensed with about 11 and about 25 molar proportions of ethylene oxide (abbreviated as $TAE_{11}$ and $TAE_{25}$).

"Capped" alcohol ethoxylates such as the acetate of $TAE_{11}$ or of other alcohol ethoxylate mentioned above.

Alkyl phenol ethoxylates such as "Tritons" (Trade Name of Rohm and Haas).

Amine oxides such as $C_{10-20}$, especially $C_{12-18}$, alkyl dimethyl amine oxide.

Ethoxy poly(propylene oxide-propylene glycol) compounds such as the "Pluronics" (Trade Name of BASF/Wyandotte Industrial Chemical Group).

Ethoxy poly (propylene oxide—ethylene diamine) such as the "Tetronics" (Trade Name of BASF/Wyandotte Industrial Chemical Group).

Polyethoxy fatty acid esters such as polyethylene glycol (M.Wt 400)—distearate, polyethylene glycol (M.Wt 1000) monostearate; usually the emulsifying agents have a hydrophilic lipophilic balance (HLB) from about 4 to 15. Preferred are tallow alcohol ethoxylates e.g. with 11 to 25 ethoxy units, similar ethoxylates of synthetic fatty alcohols, and Tween 60.

Almost any water soluble electrolyte which is aesthetically and toxigically acceptably may be used, and the electrolyte may be present in quite low concentration for instance from about 10 to about 1000 parts per million by weight of the composition, more usually about 30–200 parts per million. In some instances, sufficient electrolyte may be even provided if the local tap water is employed in the preparation of the composition. Some suitable electrolytes include calcium chloride, sodium and potassium chloride, sodium sulphate, aluminium nitrate, but a great many others will occur to those skilled in the art. In general monovalent anions are preferred, and chlorides are preferred to nitrates. Sodium and calcium chlorides are most preferred both for effectiveness and ready availability.

EXAMPLES

In the following examples, DTDMAC signifies ditallow dimethyl ammonium chloride and GMS signifies commercial grade glycerine monostearate.

EXAMPLES 1 TO 11

The following compositions were compared, the balance of the compositions being water with minor amounts of perfume and colouring matter in each example.

| | | | | | |
|---|---|---|---|---|---|
| 1. | 2.3% DTDMAC | 3.0% | GMS | 0.2% British gum (pyrodextrin) quaternised with epoxypropyl trimethyl ammonium chloride, D.S. about 0.7. Dextrin molecular weight about 3,000. | |
| 2. | 2.3% DTDMAC | 3.0% | GMS | 0.03% Poly (vinyl pyridine)/(methyl methacrylate) 57/47 by weight mixture quaternised by methyl halide. | |
| 3. | 2.3% DTDMAC | 3.0% | GMS | 0.2% GAFQUAT 755 (Trade Name) believed to be high molecular weight copolymer of vinyl pyrrolidone, m. wt about 1,000,000. | |
| 4. | 2.3% DTDMAC | 3.0% | GMS | 0.1% Eudragit E quaternised with methyl halide at about 75% of the available amine nitrogen atoms. Eudragit E (Trade Name) is believed to be a copolymer of N,N-dialkyl amino methacrylate with a neutral acrylic ester. | |
| 5. | 2.3% DTDMAC | 3.0% | GMS | 0.2% JR 125 (Trade Name). Believed to be hydroxyethyl cellulose of molecular weight about 250,000 quaternised to a D.S. of about 0.3. | |
| 6. | 2.3% DTDMAC | 3.0% | GMS | 0.2% JR 400 (Trade Name). Believed to be hydroxyethyl cellulose of molecular weight about 400,000 quaternised to a D.S. of about 0.3. | |
| 7. | 2.3% DTDMAC | 3.0% | GMS | 0.03% Poly(vinyl pyridine)/(styrene) 70/30 by weight mixture quaternised by methyl halide at about 45% of the available pyridine nitrogen atoms. | |
| 8. | 2.3% DTDMAC | 3.0% | GMS | 0.1% Cationic guar gum Guar gum quaternised to D.S. 0.25 by epoxypropyl trimethyl ammonium chloride. | |
| 9. | 2.3% DTDMAC | 3.0% | GMS | 0.2% Modocoll (Trade Name) quaternised to a D.S. of about 0.5 by epoxypropyl trimethyl ammonium chloride. | |
| 10. | 2.3% DTDMAC | 3.0% | GMS | 0.20% Cationic xanthan gum. | |
| 11. | 2.3% DTDMAC | 3.0% | GMS | 0.20% British gum quaternised to a D.S. 0.4 with epoxypropyl trimethyl ammonium chloride. | |

All these products provided substantially the same softening performance as a composition comprising 5.8% DTDMAC typical of prior art textile softening compositions.

EXAMPLES 12–13

Similar performance to that of examples 1–11 is given by compositions comprising, in water:

| | | |
|---|---|---|
| 12. | 4½% GMS 0.5% DTDMAC | 0.1% Cationic guar gum D.S. 0.25 as in example 8 |
| 13. | 4½% nonionic (i) 0.5% DTDMAC | 0.2% JR 125 as in example 5 wherein nonionic (i) consists of a mixture of 75% by weight of glycerine monostearate, 25% of monoglyceride, sunflower fatty acids comprising 20% oleic, 70% linoleic, 10% stearic. |

Substantially similar performance is obtained when the DTDMAC is replaced by an equal amount of ditallow dimethyl ammonium methosulphate, -toluene sulphonate, acetate, or benzoate.

Substantially similar performance is obtained also when the DTDMAC is replaced by an equal amount of Varisoft 455 (Trade Name—a tallow-based imidazolinium salt), $C_{16-20}$ alkyl pyridinium halide. $C_{16-20}$ alkyl methyl morpholinium halides, N-tallow-N,N$^1$N$^1$-triethanol-1,3-propylene diamine hydrodichloride.

A textile softening composition in pasty form intended to be used at less than present conventional concentration in a rinse bath comprises:
- 12% sorbitan monostearate
- 8% sorbitan mono-oleate
- 4% Tallow imidazole
- 1% N-tallow-N,N$^1$N$^1$-triethanol propylene diamine dichloride
- 0.4% Cationic Modocoll E 10 as used in Example 9
- Balance water and minor amounts of perfume, colour, bactericide etc.

A textile softening composition comprises:
- 3% Glycerol monostearate
- 1.8% DTDMAC
- 0.1% Cationic guar gum D.S. 0.25, as used in Example 8.
- Balance water and minor components.

A textile softening composition intended to be used at higher than present conventional levels in a rinse bath comprises:
- 1.5% so-called sorbitan monostearate containing 5% by weight of the acids of unsaturated acids.
- 0.16% DTDMAC
- 0.34% N-tallow-N,N$^1$,N$^1$-triethanol propylene diamine dichloride.
- 0.1% Cationic British gum as employed in Example 11.
- Balance water and minors. Similar performance is achieved if the DTDMAC and propylene diamine derivative are replaced by 0.5% of cetyltrimethyl ammonium bromide.

EXAMPLES 17-19

Washes using naturally soiled domestic washing were carried out in a Miele 422 domestic washing machine, using the 95° C. cycle. The fabric load (61 lbs) also contained cotton Terry towelling test pieces. The washes were carried out using a conventional anionic detergent-based heavy duty detergent composition. At the final rinse, employing 30 liters of water, 90 g. of a softener composition were added. The wash load was rinsed, spin-dried and line dried. The test pieces were compared for softness of feel by a panel of judges using a paired comparison technique with those treated identically with comparitive softener compositions.

Softener compositions as follows were compared with one comprising 5.8% DTDMAC in water, typical or prior art textile softening compositions. Hereinafter quantities are expressed in parts by weight unless stated to the contrary.

| 17. | | |
|---|---|---|
| Glycerine monostearate | 3.0 | |
| DTDMAC | 2.3 | |
| Cationic guar gum (D.S. 0.4) | 0.1 | |
| Perfume | 0.35 | |
| Water and colouring matter to 100 | | |

18. Similar results were obtained when the cationic guar gum was replaced by cationic hydroxyethyl cellulose JR 400 (Trade Name Union Carbide Corporation).

| 19. | | |
|---|---|---|
| Glycerol monostearate | 3.4 | |
| Glycerol monoester of C$_{16}$, C$_{18}$ C$_{20}$, fatty acids 66% by weight of which were unsaturated acids | 1.1 | |
| DTDMAC | 0.5 | |

| | |
|---|---|
| N-tallow-N,N'N'-triethanol-1,3-propylene diamine dichloride | 0.6 |
| Cationic British Gum (D.S. 0.4) | 0.1 |
| Water and dyestuff | to 100 |

All these test samples gave softening performance indistinguishable from that of the comparative sample.

EXAMPLES 20-22

The following compositions provided excellent softening performance and had viscosity in the range from 50 to 300 cps (measured as defined herein before)

| | 20 | 21 | 22 |
|---|---|---|---|
| Glycerine monostearate | 3.0% | 3.0% | 3.0% |
| DTDMAC | 2.3% | 2.3% | — |
| Varisoft 455 | — | — | 2.3% |
| Cationic Guar Gum (D.S. 0.13) | 0.2% | 0.2% | 0.2% |
| Perfume | 0.35% | 0.35% | 0.35% |
| Tallow E$_{11}$ | 0.5% | 0.5% | 0.5% |
| Calcium Chloride | 200ppm | — | 200ppm |
| Sodium Chloride | — | 300ppm | — |
| Water and colouring matter to | 100 | 100 | 100 |
| 23. Glycerine monostearate | | 3.0% | |
| DTDMAC | | 1.9% | |
| N-tallow-N,N',N'-triethanol-1,3-propylenediamine hydrochloride | | 0.8% | |
| Cationic Guar Gum | | 0.2% | |
| Tallow E$_{25}$ | | 0.4% | |

Similar products were obtained when the Tallow ethoxylates were replaced by:
Tergitol 15-S-3
Dobanol 45-3
Dobanol 45-7
Dobanol 45-11
Alfol 18-6
Alfol 18-9
Alfol 18-12
Lial 125-7
Lial 145-4
Tween 60
Triton X35
Dodecyl dimethyl amine oxide
Noxamium S2
Noxamium S11
Noxamium C9
Tallow E$_{11}$-acetate
Tetronic 1304
Pluronic L112
polyethylene glycol (M.Wt 6000).

Substantially similar results are obtained when the electrolytes named above are replaced by amounts of the following electrolytes employed in amounts providing the same ionic strength: potassium chloride, potassium nitrate, calcium nitrate, aluminium nitrate, sodium sulphate, potassium sulphate.

EXAMPLES 24 & 25

The following compositions were prepared and gave softening performance equivalent to a composition containing 5.8% alone.

| | 24 | 25 |
|---|---|---|
| Glycerine Monostearate | 1.5% | 2.5% |

-continued

|  | 24 | 25 |
|---|---|---|
| DTDMAC | 3.0% | 2.5% |
| Cationic Guar Gum (D.S. 0.13) | 0.2% | 0.2% |
| Tallow E$_{11}$ |  | 0.5% |
| Water and Miscellaneous | to 100 | |

EXAMPLES 26 & 27

The following compositions were prepared and gave softening performance substantially equivalent to that of a composition containing 5.8% DTDMAC alone.

|  | 26 | 27 |
|---|---|---|
| DTDMAC | 3.0 | 3.2 |
| Glycerine monostearate | 0.75 | — |
| Liquid paraffin (1) | 0.75 | 1.6 |
| Cationic Guar Gum (2) (D.S. 0.13) | 0.2 | 0.2 |
| Water and miscellaneous | to 100 | |

(1) C$_{14-18}$ paraffins
(2) Jaguar C13S (Trade Name)

EXAMPLES 28 & 29

The following compositions were prepared and gave softening performance substantially equivalent to that of a composition containing 5.8% DTDMAC alone.

|  | 28 | 29 |
|---|---|---|
| DTDMAC | 3.0 | 3.0 |
| Glycerine monostearate | 1.5 | 1.5 |
| Alcostat PB (1) | 0.2 | 0.07 |
| Cationic Guar Gum (D.S. 0.13) | — | 0.13 |
| Water and miscellaneous | to 100 | |

(1) believed to be a cationic comb co-polymer of triethanolamine and a dicarboxylic acid further esterified with, typically, stearic acid followed by quaternisation using dimethyl sulphate.

Composition 29 had higher viscosity than composition 28.

Similar performance is given by the compositions

|  | 30 | 31 |
|---|---|---|
| DTDMAC | 2.5 | 3.0 |
| Glycerine monostearate | 2.5 | 1.5 |
| Alcostat PB (as Example 28) | 0.2 | — |
| Cationic co-polymer (1) | — | 0.2 |

(1) Cationic co-polymer formed by condensation of adipic acid and diethylene triamine followed by quaternisation with dimethyl sulphate at about 60% of the available nitrogens.

EXAMPLES 32-34

Highly effective textile softening compositions had the formulae

|  | 32 | 33 | 34 |
|---|---|---|---|
| DTDMAC | 4 | 3 | 3 |
| Glycerine Monostearate | 1.5 | 1.5 | 1.5 |
| Alcostat C | 0.4 | 0.1 | 0.2 |
| Cationic Guar Gum (D.S. 0.13) | — | 0.1 | — |
| Water | Balance to 100 | | |

Alcostat C (Trade Name Allied Colloids Ltd) is believed to be quaternised polyethylenimine salt.

EXAMPLES 35-36

Very satisfactory textile softening compositions were prepared having the following compositions:

|  | 35 | 36 |
|---|---|---|
| DTDMAC | 3.4 | 3.2 |
| Glycerine monostearate | 1.9 | 2.2 |
| Cationic Guar Gum (D.S. 0.13) | 0.1 | 0.15 |
| Water and minors | to 100 | |

The products were prepared by mixing the DTDMAC, glycerine monostearate and cationic guar gum in the form of a melt at about 65° C., and dispersing the melt in the water, containing minor components such as perfume, bactericide etc.

Products of lower viscosity, having the same softening performance, were obtained by adding 100 parts per million by weight of calcium chloride into the water before the principal active components were admixed.

What is claimed is:

1. A textile conditioning composition comprising:
   (a) from about 0.3% to about 4% of a cationic surfactant selected from the group consisting of:
      (1) non-cyclic quaternary ammonium salts having at least one C$_{12-30}$ alkyl chain in the molecule,
      (2) C$_{8-25}$ alkyl imidazolinium salts, and
      (3) mixture thereof;
   (b) from about 2% to about 10% of a substantially water-insoluble nonionic textile conditioning agent selected from the group consisting of:
      (1) C$_{10-26}$ fatty acid esters of mono- or polyhydroxy alcohols containing 1 to 12 carbon atoms,
      (2) esters of fatty alcohols having from 12 to 24 carbon atoms in the alkyl chain and mono- or polycarboxylic acids having from 1 to 8 carbon atoms in the alkyl chain, whereby the total number of carbon atoms in the ester is equal to or greater than 16, and
      (3) mixtures thereof; and
   (c) from about 0.05% to about 0.5% of a polymeric cationic salt comprising guar gum which has been rendered cationic by attaching a cationic group to it at one or more of its reactive hydroxyl or carboxyl sites;
   wherein the weight ratio of (a)+(c) to (b) is less than 10:1.

2. The composition of claim 2 wherein the polymeric cationic salt has more than 10 monomeric units in the molecule.

3. The composition of claim 2 wherein the polymeric cationic salt is a guar gum, quaternised to a D.S. of from 0.1 to 0.5.

4. A textile conditioning composition as recited in claim 1 which is in the form of an aqueous dispersion and wherein the weight ratio of (a)+(c) to (b) is from 3:1 to 1:1.

5. The composition of claim 4 wherein the cationic surfactant is selected from a ditallow dimethyl ammonium salt, a 2-tallow-1-methyl-1-(tallow amidoethyl-)imidazoline salt and mixtures thereof.

6. The composition of claim 4 wherein the nonionic textile conditioning agent is selected from the group consisting of glycerol monostearate, glycerol distearate, glycerol mono oleate, glycerol dioleate, sorbitan monostearate, sorbitan distearate and mixtures thereof.

7. The composition of claim 4 wherein the polymeric cationic salt is a guar gum quaternized to a D.S. from 0.1 to 0.5.

* * * * *